United States Patent Office 3,380,983
Patented Apr. 30, 1968

3,380,983
FLUOROCARBON DERIVATIVE OF POLYSTYRENE AND PROCESS OF PREPARING SAME
William R. Siegart, Poughkeepsie, William D. Blackley, Wappingers Falls, Harry Chafetz, Poughkeepsie, and Ralph C. Suber, Beacon, N.Y., assignors to Texaco Inc., New York, N.Y., a corporation of Delaware
No Drawing. Filed Apr. 28, 1965, Ser. No. 451,665
15 Claims. (Cl. 260—93.5)

ABSTRACT OF THE DISCLOSURE

A fluorinated derivative of polystyrene of the empirical formula of $(C_{16}H_3F_{25})_x$ where $x$ is 3 to 5 of a melting point of 85–90° C., method of manufacture of said derivative and solid material surfaces coated with said derivative, said derivative prepared by fluorinating polystyrene of a molecular weight of 10,000–500,000 with fluorine under specific reaction and solvent treatment conditions.

---

This invention relates to a novel fluorocarbon. More particularly, it pertains to a specific fluorinated polystyrene and method of manufacture thereof. The invention further pertains to a method of coating structural surfaces with said fluorocarbon to render said surfaces oil and water repellent and corrosion resistant. The invention still further relates to the resultant structures whose surfaces are bonded to such a fluorocarbon coating.

The novel fluorinated polystyrene of the invention is a pale yellow solid oligomer of a melting point of between 85–90° C. Structurally, it is composed of chain(s) of repeating units and having an empirical formula of $(C_{16}H_3F_{25})_x$ where $x$ is an average integer of between 3 and 5. Each of the $C_{16}H_3F_{25}$ repeating units represents two chemically combined fluorinated cyclohexane analog radicals of styrene.

The $(C_{16}H_3F_{25})_x$ fluorinated polystyrene is prepared by contacting polystyrene, for example, polystyrene having an average molecular weight between about 10,000 and 500,000 with gaseous fluorine in the presence of an alkali metal fluoride catalyst at a temperature between about 20 and 105° C. The resultant fluorinated product is subjected to a first extraction utilizing one or more solvents in the liquid state selected from the group consisting of carbon tetrachloride, chloroform, methylene dichloride, pentane, petroleum ether, ethyl acetate, acetic acid, benzene, acetone, diethyl ether, tetrahydrofuran 1,4-dioxane, methyl alcohol, ethyl alcohol, isopropyl alcohol, water and concentrated mineral acid (e.g., $H_2SO_4$, HCl). After the first extraction, the solvent insoluble portion is recovered (e.g., via filtration) and subjected to a second extraction with a solvent in the liquid state selective for the fluorinated polystyrene of the invention such as haloperfluoroaliphatic and haloperfluoroaromatic hydrocarbon and haloperfluorocyclic ethers having up to 25 carbons, for example, 1,2-dichloro-1,1,2,2-tetrafluoroethane, 1,1,2-trichloro-1,2,2-trifluoroethane; a perfluorocyclic ether (five or six membered ring with fluorinated side chain) with an emperical formula of $C_8F_{16}O$ having at least a 95 vol. percent boiling range between 210–225° F., a refractive index at 77° F. of 1.274, a density at 77° F. of 1.77±0.02 and sold by Minnesota Mining & Manufacturing Co., under the tradename FC-75; bromotrifluoromethane, trichlorofluoromethane, hexafluorobenzene, chloropentafluorobenzene and dichlorotetrafluorobenzene. The extract solution is separated from the haloperfluoro solvent insoluble material (e.g., via filtration) and the haloperfluoro solvent is removed from the separated extract solution leaving the $(C_{16}H_3F_{25})_x$ fluorinated polystyrene of the invention as residue. The extractions are desirably conducted at room temperature (e.g., 20–30° C.) when possible but can be conducted between the freezing and boiling points of the extractive solvents contemplated. Further, the weight ratio of extractive solvent to solid material to be subjected to extraction is desirably between 1:1 and 100:1 although lower and higher ratios may be employed.

Under the most preferred conditions, the solvents employed and their sequence of use are as follows: (1) successively extracting the crude fluorinated polystyrene with benzene and ethyl acetate and recovering the benzene-ethyl acetate insoluble residue (2) extracting the insoluble residue with 1,1,2-trichloro-1,2,2-trifluoroethane and recovering the resultant extract solution and (3) subsequently distilling off the 1,1,2-trichloro-1,2,2-trifluoroethane leaving the $(C_{16}H_3F_{25})_x$ product of the invention.

In the fluorination of polystyrene the mole ratio of alkali metal catalyst to polymer employed is advantageously between about 1:1 and 50:1 or even higher, preferably between 5:1 and 20:1. For better control of fluorination inert diluent gas is employed with fluorine, advantageously in an amount of between about 25 and 95 volume percent of the gaseous fluorinating mixture. Specific examples of the inert diluent gas contemplated are nitrogen, helium, argon, xenon and neon.

Examples of the alkali metal fluoride catalyst contemplated herein are sodium fluoride, potassium fluoride, lithium fluoride, cesium fluoride and rubidium fluoride.

Under preferred fluorination conditions, the polystyrene, alkali metal fluoride catalyst and combinations thereof are in a finely divided state in order to facilitate contact between the polystyrene, catalyst and fluorine. Hereinbefore and hereinafter by the term "finely divided" we intend particles of an average diameter of less than about 1 mm. Under the most preferred conditions the polystyrene is present as a coating on the alkali metal fluoride catalyst during fluorination, e.g., of less than about 1 mm. thickness. This latter state is accomplished by dissolving the polystyrene in a suitable solvent therefor, mixing insoluble alkali metal fluoride in the solvent solution and under agitation conditions removing all the solvent by standard means, e.g., distillation and finely dividing, e.g., grinding the residual solids until a particle size of less than about 1 mm. average diameter is obtained. Examples of suitable solvents for dissolving the polystyrene are chlorinated liquid aliphatic hydrocarbons, nitrated liquid aliphatic and aromatic hydrocarbons, liquid aromatic hydrocarbons and ketones, for example, chloroform, methylene dichloride, carbon tetrachloride, nitrobenzene, nitropropane, benzene, toluene, xylene, acetone and methylethylketone.

As previously stated the $(C_{16}H_3F_{25})_x$ fluorinated polystyrene product of the invention is suitable for coating structural surfaces to render said surfaces corrosion resistant and oil and water repellent. Examples of structural surfaces contemplated herein are those of metal, e.g., steel, copper, brass articles, paper, sheetrock, plywood, leather and Dacron, nylon, cotton-rayon, rayon-acetate, cotton and wool fiber cloth. The coating process is accomplished by standard means. One such means is accomplished by first forming a solvent coating solution of the $(C_{16}H_3F_{25})_x$ fluorinated polystyrene. Advantageously, the fluorinated polystyrene comprises 0.1 to 30 wt. percent of the coating solution, preferably between about 0.5 to 2 wt. percent for paper surfaces, between about 5 and 20 wt. percent for cloth surfaces, and between 1 and 25 wt. percent for wood and metal surfaces. Any of the aforementioned haloperfluoro solvents which are readily volatilizable (e.g., B.P. less than about 100° C.) are suitable. Examples of particularly suitable solvents are trichlorotrifluoroethane (e.g., $CCl_2F$–$CClF_2$), 1,2 - dichloro-1,1,2,2 - tetrafluoroethane, chlorotrifluoromethane and FC–75. The method of application to the desired surface is accomplished by any standard means such as dipping, spraying (e.g., as an aerosol) or brushing the preformed solvent solution of the $(C_{16}H_3F_{25})_x$ fluorinated polystyrene product on the surface and permitting the volatilizable diluent to evaporate either at ambient or elevated temperature leaving the desired coating of the polystyrene product on the treated surface. Coating thicknesses may vary widely depending on the material to be coated and the use of the material. However, thicknesses of less than about 1 mm., preferably between about $1 \times 10^{-7}$ and 1 mm. are normally employed. Alternatively, the $(C_{16}H_3F_{25})_x$ fluorinated polystyrene may also be applied to structural surfaces by first melting the $(C_{16}H_3F_{25})_x$ fluorinated polystyrene and applying it to the desired surface by brushing, spraying and dipping in the molten state and subsequently permitting it to solidify by cooling to form the desired coatings.

One advantage of the fluorinated polystyrene product of the invention as a coating over the fluorinated polystyrene of the prior art is found in the fact that many of the prior art fluorinated polystyrenes were not solvent soluble or of such high melting point as to render their direct application to surfaces impractical. One means the prior art employed to coat surfaces with the previously known fluorinated polystyrenes was to first coat the surface with polystyrene using the aforedescribed solvent coating techniques and then fluorinating the polystyrene coated surface with fluorine thereby forming a fluorinated polystyrene coating. Since fluorine is very reactive, great care had to be taken in completely coating with polystyrene the surfaces to be exposed to the fluorine treatment. Further, because of the highly active nature of fluorine, fluorination had to be conducted in an enclosed area and if the structure to be coated and fluorinated was of unique or of large design the enclosing container often proved costly. These two undesirable features are eliminated by use of the relatively low melting, solvent soluble $(C_{16}H_3F_{25})_x$ fluorinated polystyrene of the invention.

The following examples further illustrate the invention but are not to be considered limitations thereof.

EXAMPLE I

This example illustrates the preparation of the fluorinated polystyrene of the invention.

In 500 ccs. of chloroform there was dissolved 60 grams of polystyrene of an average molecular weight of 10,160. To the resultant solution 200 grams of sodium fluoride of a fineness sufficient to pass a 1 mm. sieve were added. The suspension was stirred and placed under a stream of nitrogen at room temperature until all the choloform had evaporated. The residuel polystyrene-sodium fluoride solid mixture was then dried and ground to a fineness sufficient to pass a 1 mm. screen. To a 0.7 liter vertical reactor fitted with a gas inlet tube at the bottom and a gas exit tube at the top, 235 grams of the ground solids were charged thereto. A gaseous mixture of fluorine and nitrogen was introduced into the reactor at a rate of 140 ccs./min., (40 ccs. $F_2$/100 ccs. $N_2$) for a period of 13.6 hours with the temperature maintained in the range of between about 58 and 61° C. At the end of the 13.6 hour period the flow rate of fluorine was reduced to 20 ccs./min. and fluorination was continued for an additional 62.4 hours. The reaction temperature ranged up to 98° C. At the end of the 53.8 hour of the fluorination period 50 grams of finely divided sodium fluoride were added. At the end of the fluorination period, 392 grams of gray colored solid product were removed and extracted several times with two liter portions of distilled water and three times with one liter portion of concentrated hydrochloric acid. The extract solutions were discarded. The residual solid product was rinsed with distilled water and dried and weighed 166 grams. The dried product was then extracted with 600 ccs. of chloroform and the chloroform insoluble material was dried and further extracted with 600 ccs. of ethyl acetate. The ethyl acetate extract solution was discarded and the ethyl acetate insoluble residue was dried (yield=101 grams) and then extracted with 1 liter of concentrated sulfuric acid. The sulfuric acid insoluble residue was then rinsed thoroughly with distilled water and dried. The foregoing extractions were conducted at room temperature.

To 100 ccs. of FC–75 there was added 10 grams of the sulfuric acid insoluble residue and the resultant mixture was heated to boiling (99–107° C.) then filtered and cooled. The filtrate was recovered, the black insoluble solid was set aside and the FC–75 was removed from the filtrate by distillation at 30° C. under 18 mm. Hg yielding 8.5 grams of a first recovered pale yellow solid having a melting point of 85–90° C. The foregoing FC–75 treatment was again repeated on 29.9 grams of said sulfuric acid insoluble material using 100 ccs. of FC–75 with a recovery of 26 grams of a second recovered pale yellow solid of a 85–90° C. melting point. Both the first and second pale yellow solid were combined and analyzed. Infrared analysis indicated a strong carbon fluorine absorption with definite cyclohexane peaks. Elemental analysis found wt. percent carbon=27.9, wt. percent hydrogen=0.45 and wt. percent fluorine=70.3 and the average molecular weight was determined to be about 2328. The yellow product was insoluble at room temperature and at reflux in $CHCL_3$, $CH_2Cl_2$, $CCl_4$, pentane, petroleum ether, ethyl acetate, acetic acid, benzene, acetone, diethylether, tetrahydrofuran, 1,4-dioxane, methyl alcohol, ethyl alcohol, isopropyl alcohol. Concentrated sulfuric acid, hydrochloric acid, nitric acid and 2 N sodium hydroxide had no effect on the yellow product after four hours of contact. In contact with concentrated ammonia the yellow product solid turned light brown. It was found soluble in FC–75, 1,2-dichloro-1,1,2,2-tetrafluoroethane, chlorotrifluoromethane and trichlorotrifluoroethane. The foregoing and nuclear magnetic resonance analyses determined the yellow product to be of the empirical formula $(C_{16}H_3F_{25})_{3.33}$ comprising a mixture of oligomeric compounds of varying chain length together averaging 3.33 repeating units where each repeating $C_{16}H_3F_{25}$ unit in the chain is composed of two chemically combined fluorinated cyclohexane radical analogs of styrene.

EXAMPLE II

This example illustrates the preferred method of preparing the $(C_{16}H_3F_{25})_x$ fluorinated polystyrene of the invention.

Polystyrene (60 g.) of an average molecular weight of 10,160 was dissolved in benzene (500 mls.) and finely divided sodium fluoride (250 g.) was added. The solvent was removed from the stirred suspension under a stream of nitrogen at room temperature. The resultant polystyrene coated sodium fluoride mass was dried and ground into fine particles having a diameter less than 1 mm. The finely divided polystyrene coated alkali metal fluoride particles (310 g.) were charged to a stirred reactor and a mixture of fluorine (22.7 ccs./min.) and nitrogen (100 ccs./min.) was passed therethrough for a period of 82.6 hours with the reactor temperature averaging during that period 33° C. At the end of the 82.6 hour period a positive $F_2$ test (starch Ki paper) was obtained in the reactor's exit gases and the reactor temperature was incrementally raised until a negative $F_2$ test was obtained. The increasing temperature phase of the fluorination was continued an additional 17 hours at a fluorine rate of 30 ccs./min. (100 ccs./min. $N_2$) and until the reactor temperature reached 100° C. At the end of fluorination 498 grams of white solid were extracted with two 800 mls. portions of benzene and the benzene insoluble material was recovered from the extract solutions via filtration. The benzene insoluble material (488 grams) was extracted with two 800 mls. portions of ethyl acetate and the ethyl acetate insoluble material was recovered from the ethyl extract solution via filtration. The benzene-ethyl acetate insoluble material was extracted two times with 800 mls. portions of 1,1,2-trichloro-1,2,2-trifluoroethane and the resultant mixture was filtered after each extraction. The insoluble materials were discarded and the filtrates combined. The trichlorotrifluoroethane solvent was removed under vacuum to yield 157.5 grams (84 wt. percent yield) of a pale yellow solid having a melting point of 85–90° C. Further analysis of the yellow product found it to have wt. percent C=28.2, wt. percent H=0.6, wt. percent F=71.2 and a M.W.=2590. The foregoing and infrared spectra and nuclear magnetic resonance analysis determined the yellow product to be of the empirical formula $$(C_{16}H_3F_{25})_{3.87}$$

comprising a mixture of telomeric compounds of varying chain length having an average of 3.87 repeating units where each repeating $C_{16}H_3F_{25}$ unit in the chain are two chemically combined fluorinated cyclohexane radical analogs of styrene.

EXAMPLE III

This example illustrates the protection of metal surface from corrosion by coating said surfaces with the $$(C_{16}H_3F_{15})_x$$

fluorinated polystyrene product of the invention.

Nine polished steel panels of 2" x 4" dimensions were degreased by successively washing with carbon tetrachloride, benzene and acetone. Weighed test panels 1, 2, 3 and 4 were then dipped in a solution comprising 12 grams of the fluorinated polystyrene of Example I in 120 ccs. of FC-75 and Panels 5, 6, 7 and 8 were dipped in a solution of 12 grams of $(C_{16}H_3F_{25})_{3.33}$ fluorinated polystyrene product of Example I and 240 ccs. of FC-75. The ninth panel was a blank and was dipped in FC-75. The test panels were air dried in an oven at 85° C. for thirty minutes and reweighed. The panels were subjected to an ASTM D-1784 Humidity Cabinet Rust Test.

The test data and results are reported below in Table I:

TABLE I

| Panel No. | Wt. of Fluorinated Polystyrene coating, g. | Results of Rust Test |
|---|---|---|
| 1 | 0.028 | Rust specks. |
| 2 | 0.027 | Do. |
| 3 | 0.029 | Do. |
| 4 | 0.028 | Do. |
| 5 | 0.012 | Moderate rust. |
| 6 | 0.011 | Do. |
| 7 | 0.011 | Do. |
| 8 | 0.011 | Do. |
| Blank | 0 | Heavy rust of entire panel. |

EXAMPLE IV

This example illustrates the water repellency of surfaces coated with the $(C_{16}H_3F_{25})_x$ fluorinated polystyrene product of Example I.

Nine strips of cotton cloth of approximately 1¾" x 1¾" dimensions were dipped in a FC-75 solution of the $(C_{15}H_3F_{25})_{3.33}$ fluorinated polystyrene of Example I, removed and air dried and then tested for water and oil repellency by contacting with water and a mineral lubricating oil of a viscosity of about 500 SUS at 100° F. A cloth strip dipped only in FC-75 and subsequently dried was utilized as the blank. The test data and results are reported below in Table II:

TABLE II

| Strip No. | Conc. of Ex. I Product in 10 mls. FC-75, g. | Wt. of Ex. I Product on Cloth, g. | Water Repellency | Oil Repellancy |
|---|---|---|---|---|
| A1C | 0.1 | .005 | Partial | No. |
| A2C | 0.1 | .006 |  | No. |
| B1C | .01 | .0004 | No | No. |
| B2C | .01 | .0004 |  | No. |
| C1C | .5 | .02 | Partial |  |
| C2C | .5 | .03 |  | Partial. |
| D1C | 1 | .06 | Yes |  |
| D2C | 1 | .05 |  | Yes. |
| Blank | 0 | 0 | No | No. |

In the foregoing test the cotton strips A and B looked and felt like untreated material and C and D were slightly stiff but when crumpled once again felt like untreated cloth without changing repellent characteristics.

EXAMPLE V

This example illustrates the water and oil repellency of paper surfaces impregnated with the fluorinated polystyrene of the invention.

Eight strips of paper toweling of 1" x 2½" dimensions were dipped in a solution of the $(C_{16}H_3F_{25})_{3.33}$ fluorinated polystyrene of Example I dissolved in FC-75 and air dried. A blank was also run in which a strip of paper towel was dipped in FC-75 only. The treated paper was then contacted with water and mineral lubricating oil to determine repellency. The test data and results are reported below in Table III.

TABLE III

| Paper Strip No. | Conc. of Ex. I Product in 10 mls. of FC-75 | Wt. of Ex. I Product on Strip, g. | Water Repellency | Oil Repellency |
|---|---|---|---|---|
| A1 | 0.1 | .001 | Yes |  |
| A2 | 0.1 | .001 |  | Yes. |
| B1 | .01 | .0003 | Very slight wetting. |  |
| B2 | .01 | .0001 |  | No. |
| C1 | .5 | .007 | Yes |  |
| C2 | .5 | .008 |  | Yes. |
| D1 | 1 | .01 | Yes |  |
| D2 | 1 | .02 |  | Yes. |
| Blank | 0 | 0 | No | No. |

EXAMPLE VI

This example further illustrate the water repellency imparted to surfaces of various materials by the fluorinated polystyrene product of the invention.

Half of each of the following panels of different materials were dipped in a solution comprising 1 gram of the fluorinated polystyrene product of Example I per 10 ccs. of FC-75 and the other half of each test panel was undipped as control. The impregnated surfaces were air dried and the specimen was placed in a test tube of distilled water for a period of approximately 1 month. The following panels were tested: cardboard, Kraft paper bag, asbestos paper tape, Luan Phillipine mahogany, cardboard box, sheetrock, and lens tissue. After approximately 1 month of soaking the coated portions of the test panels evidenced no absorption of water whereas the uncoated portions gave definite evidence of water absorption.

EXAMPLE VII

This example still further illustrates the oil and water repellency imparted to surfaces of textile fibers.

Weighed 2 x 2 inch pieces of cotton, Dacron, cotton-rayon, and rayon-acetate were subjected to the following treatments:

(A) Soaked in 1,1,2-trifluoro-1,2,2-trichloroethane for 10 minutes, dried and weighed. Tested for repellency to water, mineral oil (MO) and cottonseed oil (CO).

(B) Soaked in 10 wt. percent solution of the $(C_{16}H_3F_{25})_{3.33}$ fluorinated polystyrene of Example I in 1,1,2 - trifluoro - 1,2,2, - trichloroethane for one minute, dried, and weighed. Tested as in (A).

(C) Soaked in 10 wt. percent solution of the $(C_{16}H_3F_{25})_{3.33}$ fluorinated polystyrene of Example I in 1,1,2-trifluoro-1,2,2-trichloroethane for 10 minutes, dried and weighed. Tested as in (A).

Treatment (A) appeared to have no great detrimental effect on any of the swatches, except for slight bleeding of one red dye. Treatment (B) resulted in increases in weight ranging from 17 to 59% and treatment (C) resulted in weight increases from 12 to 55%. The increases in weight appeared to be related to the structure of the fabric. For example, the greatest increases were in the loose weave and pile samples and the smallest increases in the light weaves. This may simply reflect the amount of solution retained by the fabric when withdrawn from the solution. Treatment with fluorinated polystyrene solutions made all the materials water repellent. It also made most of them at least partially oil repellent, that is, the oil formed a drop which was easily wiped off without leaving a noticeable stain. Time of treating had no appreciable effect on this properties. It was noted that fluorinated polystyrene treatment imparted stiffness to the fabrics. Ruffling the material generally restored its flexibility.

In the foregoing examples we define a material as being "repellent" when the test liquid droplet stands up on material and does not wet it. The term "slightly repellent" or "partially repellent" means droplet stands up on material tested but does wet said material to a small degree.

We claim:
1. A fluorinated derivative of polystyrene of the empirical formula of $(C_{16}H_3F_{25})_x$ where $x$ is an average integer of between about 3 to 5 having a melting point between about 85 and 90° C. prepared by the process comprising contacting polystyrene having an average molecular weight between about 10,000 and 500,000 with sufficient gaseous fluorine to produce a product having a carbon to hydrogen to fluorine mole ratio of 16:3:25 in the presence of an alkali metal fluoride catalyst at a temperature between about 20 and 105° C., subjecting the resultant solid product to a first solvent treatment comprising extracting the resultant reaction mixture with at least one first solvent selected from the group consisting of carbon tetrachloride, chloroform, methylene dichloride, pentane, petroleum ether, ethyl acetate, acetic acid, benzene, acetone, diethylether, tetrahydrofuran, 1,4-dioxane, methyl alcohol, ethyl alcohol, isopropyl alcohol, water and concentrated mineral acid, separating the resultant first solvent solution from the first solvent insoluble material, subsequently subjecting said first solvent insoluble material to a second solvent treatment comprising extracting said first solvent insoluble material with a second solvent selected from the group consisting of bromotrifluoromethane, trichlorofluoromethane, 1,2-dichloro-1,1,2,2-tetrafluoroethane, 1,1,2-trichloro-1,2,2-trifluoroethane, hexafluorobenzene, chloropentafluorobenzene, dichlorotetrafluorobenzene and perfluorocyclicether of an empirical formula of $C_8F_{16}O$ having at least a 95 volume percent boiling range between 210 and 225° F., a refractive index of 1.274 and a density of 1.77±0.02 at 77° F., separating the resultant second solution from the second haloperfluoro solvent insoluble material and separating said second solvent from said resultant second solution leaving said fluorinated derivative of polystyrene as residue.

2. The derivative in accordance with claim 1 wherein said gaseous fluorine is in admixture with an inert diluent gas, said inert diluent gas comprising between about 25 and 95 volume percent of said admixture, the mole ratio of said alkali metal catalyst to said polystyrene is between about 5:1 and 20:1 and wherein said polystyrene is present during fluorination as a coating on said catalyst and the coated catalyst has an average particle size of less than 1 mm. in diameter.

3. A derivative in accordance with claim 2 wherein said first solvent treatment comprises successive extractions with benzene and ethyl acetate and said second solvent is 1,1,2-trifluoro-1,2,2-trifluoroethane.

4. A derivative in accordance with claim 2 wherein said first solvent treatment comprises successive extractions with water, hydrochloric acid, chloroform, ethyl acetate and sulfuric acid and wherein said second solvent is said perfluorocyclic ether.

5. A fluorinated derivative in accordance with claim 3 where $x$ is 3.87.

6. A fluorinated polystyrene in accordance with claim 4 where $x$ is 3.33.

7. A solid material surface having bonded thereto a coating of the derivative of claim 1.

8. A surface in accordance with claim 7 wherein said material is selected from the group consisting of metal, wood, paper, asbestos and textile fiber.

9. A process of coating a solid material surface by contacting said surface with a solution comprising the derivative of claim 1 dissolved in a third solvent selected from the group consisting of haloperfluorohydrocarbon and haloperfluoroether of less than 25 carbons and subsequently removing said third solvent from the resultant coating.

10. A process is accordance with claim 9 wherein said material is selected from the group consisting of metal, wood, paper, asbestos and textile fibers and said third solvent is 1,1,2-trichloro-1,2,2-trifluoroethane.

11. A process in accordance with claim 9 wherein said material is selected from the group consisting of metal, wood, paper, asbestos and textile fibers and said third solvent is perfluorocyclic ether of the empirical formula of $C_8F_{16}O$ having at least a 95 volume percent boiling point between 210 and 225° F., a refractive index at 1.274 and a density of 1.77±0.02 at 77° F.

12. A method of preparing a fluorinated derivative of polystyrene of the empirical formula of $(C_{16}H_3F_{25})x$ where $x$ is an average integer of between about 3 to 5 having a melting point between about 85 and 90° C. prepared by the process comprising contacting polystyrene having an average molecular weight between about 10,000 and 500,000 with sufficient gaseous fluorine to produce a product having a carbon to hydrogen to fluorine mole ratio of 16:3:25 in the presence of an alkali metal fluoride catalyst at a temperature between about 20 and 105° C., subjecting the resultant solid product to a first solvent treatment comprising extracting the resultant reaction mixture with at least one first solvent selected from the group consisting of carbon tetrachloride, chloroform, methylene dichloride, pentane, petroleum ether, ethyl acetate, acetic acid, benzene, acetone, diethylether, tetrahydrofuran, 1,4-dioxane, methyl alcohol, ethyl alcohol, isopropyl alcohol, water and concentrated mineral acid, separating the resultant first solvent solution from the first solvent insoluble material, subsequently subjecting said first solvent insoluble material to a second solvent treatment comprising extracting said first solvent insoluble material with a second solvent selected from the group of bromotrifluoromethane, trichlorofluoromethane, 1,2-dichloro - 1,1,2,2 - tetrafluoroethane, 1,1,2-trichloro-1,2,2-trifluoroethane, hexafluorobenzene, chloropentafluorobenzene, dichlorotetrafluorobenzene and perfluorocyclicether of an empirical formula of $C_8F_{16}O$ having at least a 95 volume percent boiling range between 210 and 225° F., a refractive index of 1.274 and a density of 1.77±0.02 at 77° F., separating the resultant second solution from the second haloperfluoro solvent insoluble material and separating said second solvent from said resultant second solution leaving said fluorinated derivative of polystyrene as residue.

13. A method in accordance with claim 12 wherein said gaseous fluorine is in admixture with an inert diluent gas, said inert diluent gas comprising between about 25 and 95 volume percent of said admixture, the mole ratio of said alkali metal catalyst to said polystyrene is between about 5:1 and 20:1 and wherein said polystyrene is present during fluorination as a coating on said catalyst and the coated catalyst has an average particle size of less than 1 mm. in diameter.

14. A method in accordance with claim 13 wherein said first solvent treatment comprises successive extractions with benzene and ethyl acetate and said second solvent is 1,1,2-trifluoro-1,2,2-trifluoroethane.

15. A method in accordance with claim 13 wherein said first solvent treatment comprises successive extractions with water, hydrochloric acid, chloroform, ethyl acetate and sulfuric acid and wherein said second solvent is said perfluorocyclic ether.

References Cited

UNITED STATES PATENTS

| | | | |
|---|---|---|---|
| 2,186,917 | 1/1940 | Gaylor | 260—93.5 |
| 2,934,572 | 4/1960 | Baer | 260—648 |
| 3,008,998 | 11/1961 | Haszeldine | 260—648 |

JAMES A. SEIDLECK, *Primary Examiner.*